(12) United States Patent
Kino et al.

(10) Patent No.: US 9,787,166 B2
(45) Date of Patent: Oct. 10, 2017

(54) MANUFACTURING METHOD OF STATOR AND STATOR AND MOTOR

(71) Applicant: TOYOTA JIDOSHA KABUSHIKI KAISHA, Toyota-shi (JP)

(72) Inventors: Masahiro Kino, Toyota (JP); Yukihisa Yamamoto, Seto (JP); Masashige Tanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 198 days.

(21) Appl. No.: 14/551,414

(22) Filed: Nov. 24, 2014

(65) Prior Publication Data
US 2015/0145353 A1    May 28, 2015

(30) Foreign Application Priority Data

Nov. 28, 2013 (JP) ................. 2013-246017

(51) Int. Cl.
*H02K 1/04* (2006.01)
*H02K 15/12* (2006.01)
*H02K 5/08* (2006.01)

(52) U.S. Cl.
CPC ............ *H02K 15/12* (2013.01); *H02K 1/04* (2013.01); *H02K 5/08* (2013.01)

(58) Field of Classification Search
CPC .......... H02K 15/12; H02K 15/10; H02K 5/08; H02K 1/04
See application file for complete search history.

(56) References Cited

U.S. PATENT DOCUMENTS

| | | | |
|---|---|---|---|
| 2011/0193430 A1 | 8/2011 | Takada | |
| 2013/0257183 A1* | 10/2013 | Yokogawa | H02K 5/02 310/43 |

FOREIGN PATENT DOCUMENTS

| | | |
|---|---|---|
| JP | 52-041801 A | 3/1977 |
| JP | 57-006546 A | 1/1982 |
| JP | 05-056611 A | 3/1993 |
| JP | 2006-021329 A | 1/2006 |
| JP | 2006-115659 A | 4/2006 |
| JP | 2010-110153 A | 5/2010 |

* cited by examiner

*Primary Examiner* — Mathieu Vargot
(74) *Attorney, Agent, or Firm* — Andrews Kurth Kenyon LLP (57) ABSTRACT

A manufacturing method of a stator is a method for manufacturing the stator using molds. The stator is constructed so that a stator main body and resin molded portion are integrated. The stator main body includes a terminal portion and a core. The manufacturing method includes: arranging the stator main body such that the terminal portion is located on a top portion of the molds; and filling a cavity with resin. The terminal portion has a gas discharging port configured to discharge gas out of the cavity from inside the cavity in the molds.

2 Claims, 15 Drawing Sheets

MANUFACTURING METHOD OF STATOR AND STATOR AND MOTOR

INCORPORATION BY REFERENCE

The disclosure of Japanese Patent Application No. 2013-246017 filed on Nov. 28, 2013 including the specification, drawings and abstract is incorporated herein by reference in its entirety.

BACKGROUND OF THE INVENTION

1. Field of the Invention

The present invention relates to a manufacturing method of a stator, and the same stator and a motor.

2. Description of Related Art

There exists a stator which is obtainable by stacking a plurality of electromagnetic steel sheets and integrating them with resin. Injection molding method is used to integrate the electromagnetic steel sheet with resin.

For example, Japanese Patent Application Publication No. 2006-021329 (JP 2006-021329 A), has disclosed an injection molding method for forcibly discharging air inside a mold using a vacuum apparatus and injecting resin into the mold. Using such an injection molding method enables a resin molded portion having few defects to be obtained. Such injection molding can be used as the above-described manufacturing method of the stator.

By the way, another manufacturing method of a stator provided with the resin molded portion having few defects using a simpler apparatus has been demanded. Although the manufacturing method disclosed in the JP 2006-021329 can obtain such a resin molded product having few defects, it requires use of the vacuum apparatus.

Accordingly, the present invention provides a manufacturing method of the stator which contains the resin molded portion having few defects using the simpler apparatus. In addition, the present invention discloses the stator manufactured according to the above-described manufacturing method and a motor using the same stator.

SUMMARY OF THE INVENTION

The manufacturing method of a stator according to the present invention is a method for manufacturing the stator using molds. The stator is constructed so that a stator main body and resin molded portion are integrated and the stator main body includes a terminal portion and a core. The manufacturing method includes: arranging the stator main body such that the terminal portion is located on a top portion of the molds; and filling its cavity with resin. The terminal portion has a gas discharging port configured to discharge gas out of the cavity from inside the cavity in the molds.

With such a structure, the stator provided with a resin molded portion having few defects can be manufactured using a simpler apparatus.

The gas discharging port may be consist of a recess portion. The recess portion formed on a part of a plane of the terminal portion. The terminal portion contacts with the electromagnetic steel sheet in the plane. Further, the gas discharging port may be consist of a pipe which passes through the terminal portion.

A stator according to another aspect of the present invention comprises a stator main body. The stator main body includes a terminal portion and a core. The stator is constructed such that the stator main body and resin molded portion are integrated. The stator is manufactured by arranging the stator main body such that the terminal portion is located on a top portion of a molds, and filling the cavity with resin. The terminal portion has a gas discharging port configured to discharge gas out of the cavity from inside the cavity in the molds. A motor according to another aspect of the present invention comprising a stator. The stator includes a stator main body, and the stator main body includes a terminal portion and a core. The stator is constructed such that the stator main body and resin molded portion are integrated. The stator is manufactured by arranging the stator main body such that the terminal portion is located on a top portion of a molds, and filling the cavity with resin. The terminal portion has a gas discharging port configured to discharge gas out of the cavity from inside the cavity in the molds.

With such a structure, the stator provided with a resin molded portion having few defects can be obtained. Further, a motor having the stator provided with the resin molded portion having few defects can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
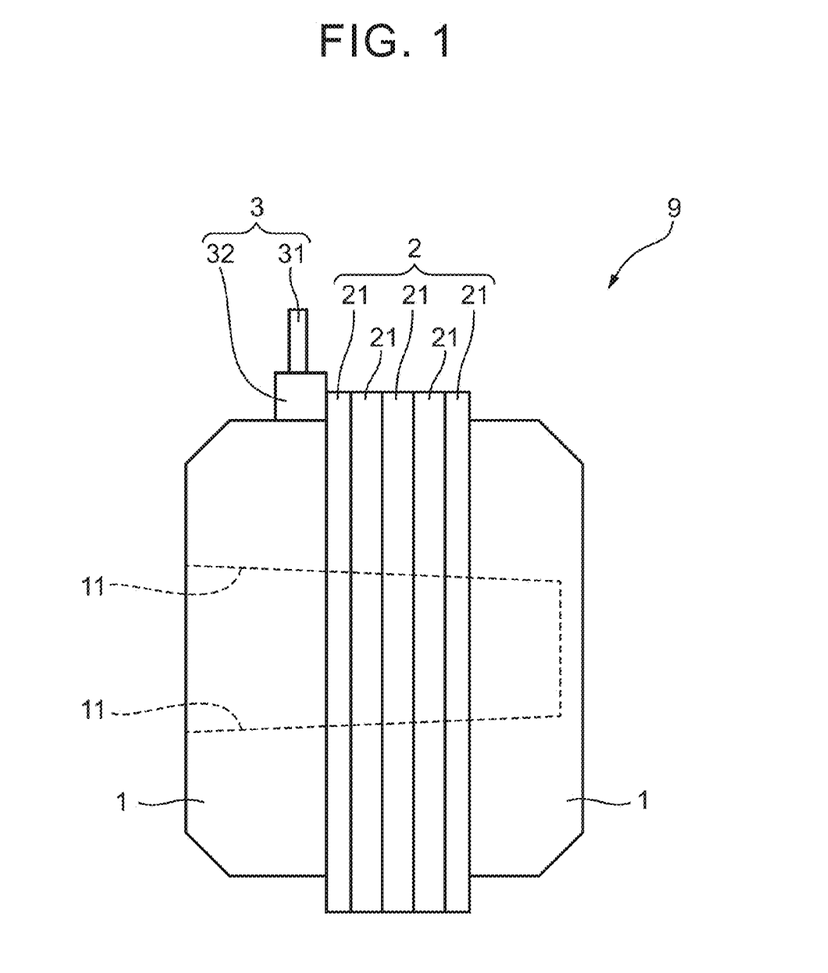
FIG. 1 is a side view of a molded body according to a first embodiment.
Figure 2:
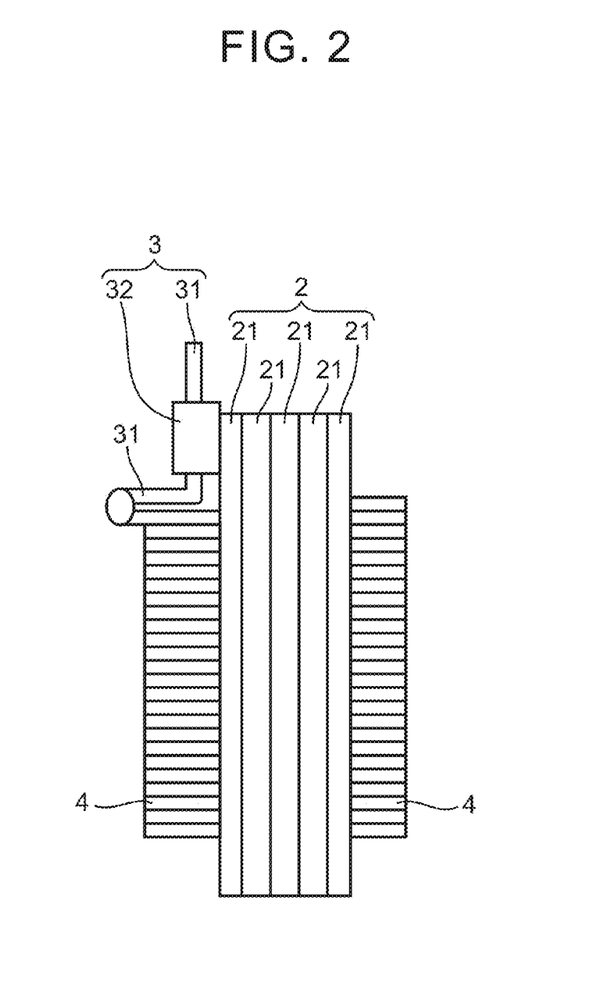
FIG. 2 is a side view of a major portion of the molded body according to the first embodiment.
Figure 3:
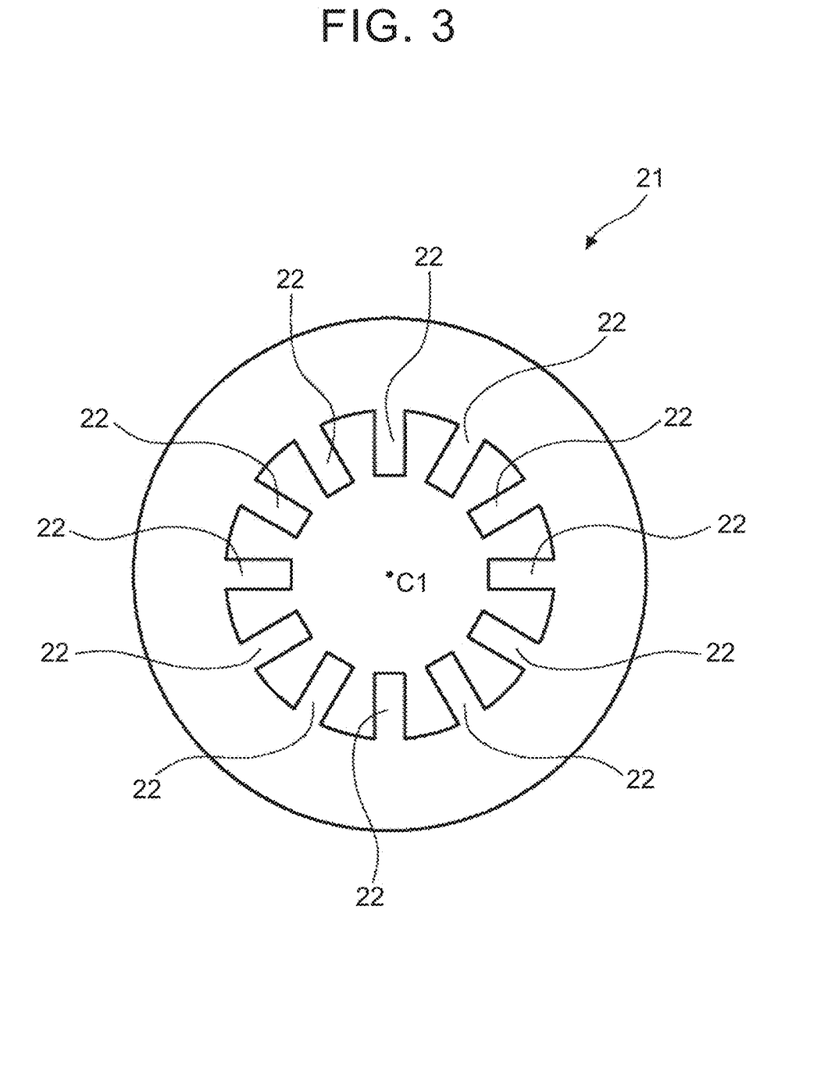
FIG. 3 is a front view of the major portion of the molded body according to the first embodiment.
Figure 4:
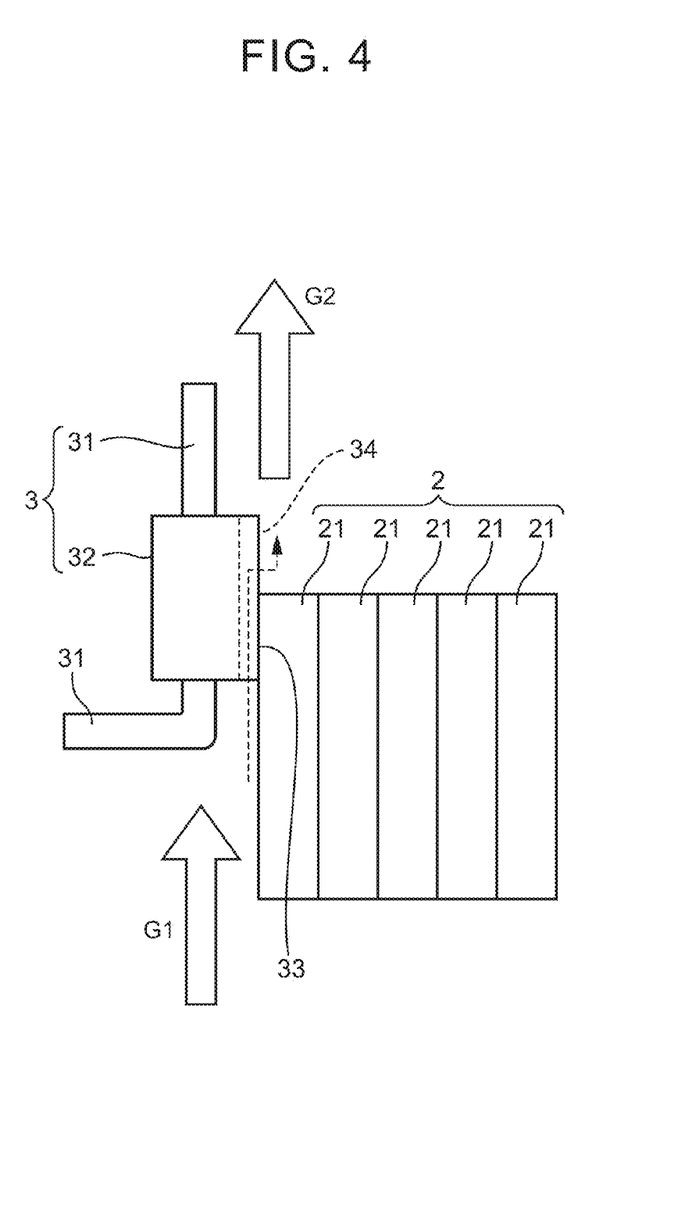
FIG. 4 is a side view of the major portion of the molded body according to the first embodiment.
Figure 5:
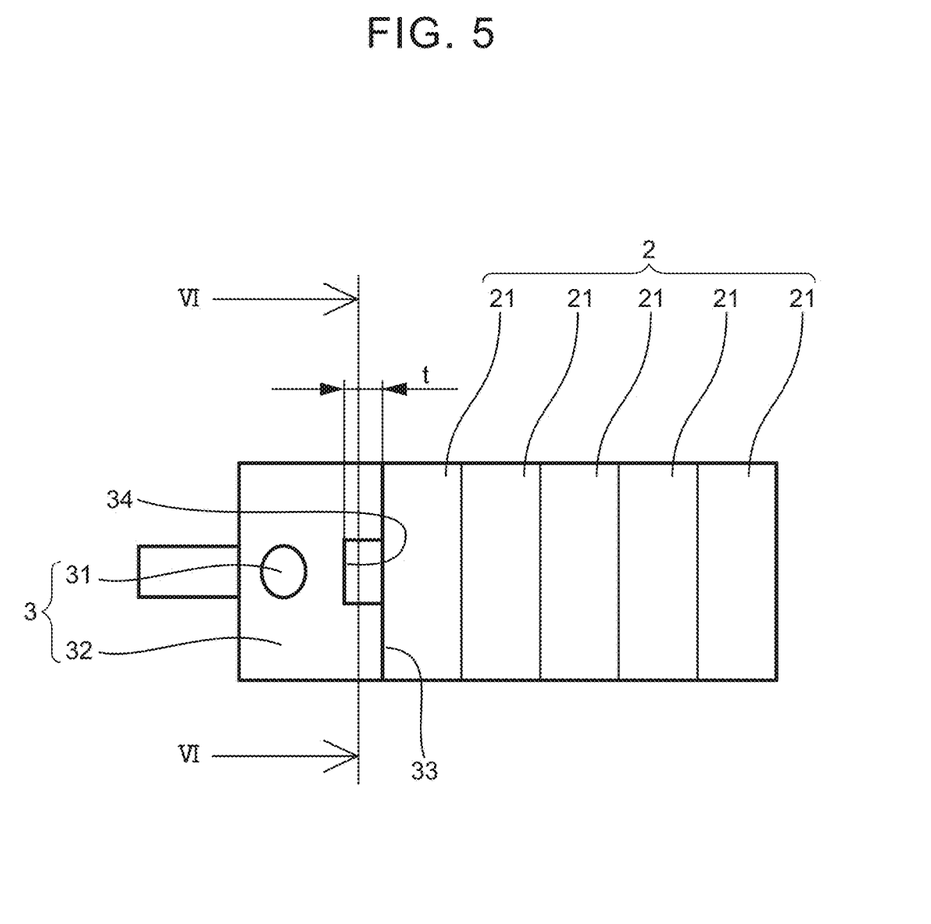
FIG. 5 is a top view of the major portion of the molded body according to the first embodiment.
Figure 6:
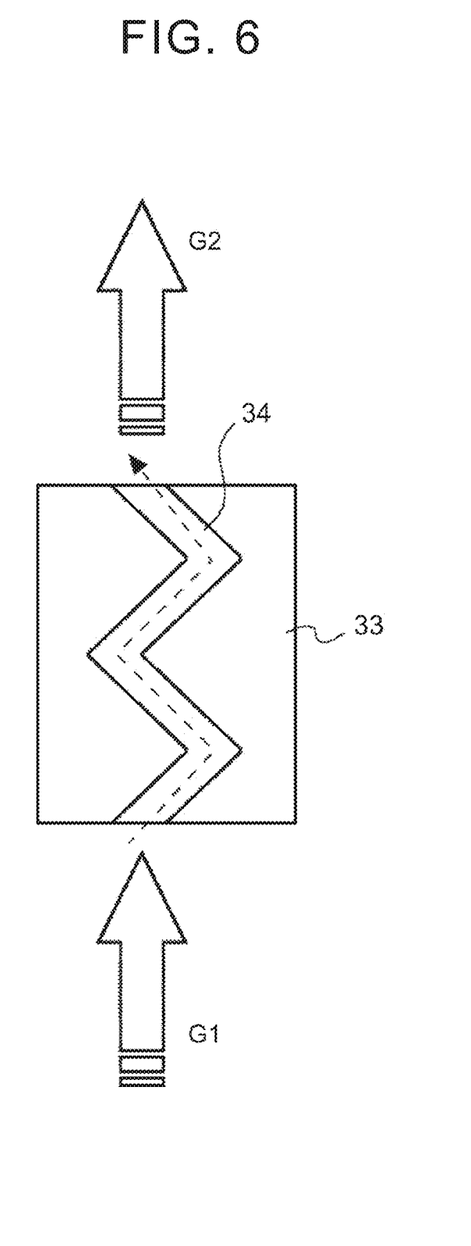
FIG. 6 is a front view of the major portion of the molded body according to the first embodiment.

First embodiment 1. A molded body according to the first embodiment will be described with reference to FIGS. 1 to 6. FIG. 1 is a side view of the molded body according to the first embodiment. FIG. 2 and FIG. 4 are a side view of a major portion of the molded product according to the first embodiment. FIG. 3 and FIG. 6 are a front view of the major portion of the molded product according to the first embodiment. FIG. 5 is a top view of the major portion of the molded body according to the first embodiment.

As shown in FIG. 1, the molded body 9 includes a resin portion 1, a core 2 and a terminal portion 3. A stator main body includes the core 2 and the terminal portion 3. The stator main body is a main component of the stator, or an assembly of such a components. The molded body 9 is used as a stator of a motor.

The resin portion 1 is a cylindrical body having an internal circumferential face 11. The resin portion 1 is obtained by injection molding.

As shown in FIG. 2, the core 2 has a structure in which a plurality of electromagnetic steel sheets 21 are stacked. As shown in FIG. 3, the electromagnetic steel sheet 21 is an annular sheet which has a plurality of teeth 22 projecting toward a center C1 on its internal circumferential face. In the core 2, the direction of the plural electromagnetic steel sheets 21 is fixed such that the teeth 22 are stacked. Referring to FIG. 2 again, a coil 4 is wound around each of the stacked teeth 22. The resin portion 1 (see FIG. 1) is formed so as to cover the teeth 22 and the coils 4. Further, the resin portion 1 is also formed so as to cover part of the terminal portion 3. The core 2, the terminal portion 3 and the coil 4 are joined by the resin portion 1 so that they are integrated.

As shown in FIGS. 4 and 5, the terminal portion 3 includes a terminal 31 and a base portion 32 which holds the terminal 31. A face 33 of the base portion 32 makes contact with the core 2. Referring to FIG. 2 again, the terminal 31 is electrically connected to the coil 4. Referring to FIGS. 4 and 5 again, a slit 34 is formed in the face 33. The slit 34 is a recess portion formed in part of the face 33 which makes contact with the core 2 of the base portion 32, for example. The length t of a gap between the core 2 and the slit 34 has a size at least allowing gas to pass through. The range of the length t of the gap is preferably 0.01 to 0.2 mm. Here, it is assumed that gas flows in a direction G1 which goes upward from below the terminal portion 3. Then, gas passes through the gap between the slit 34 and the core 2 and further, flows in a direction G2 which goes upward from the top side of the terminal portion 3. Further, the resin portion 1 may invade into the gap between the core 2 and the slit 34. The terminal 31 is made of conductive material, for example, copper or copper alloy. The base portion 32 is made of, for example, resin.

As shown in FIG. 6, the slit 34 extends in a zigzag manner. Comparing with a slit which extends upward in a linear manner, the slit 34 has a long passage on a plane of the same size and shape.

Figure 7:
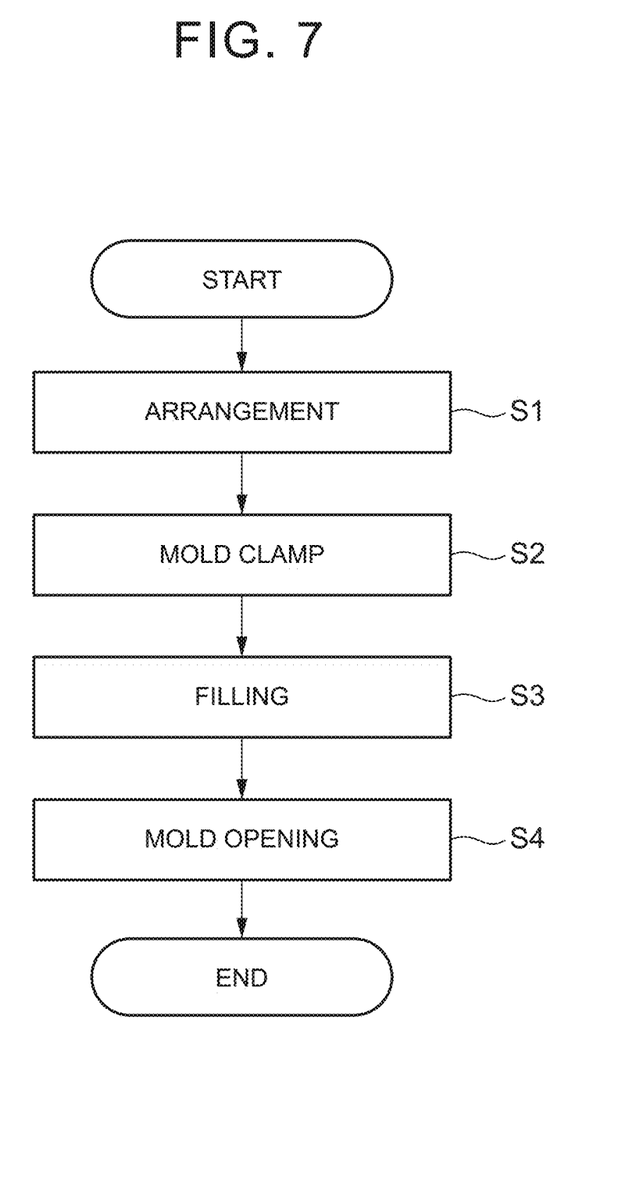
FIG. 7 is a flow chart of a manufacturing method according to the first embodiment.
Figure 8:
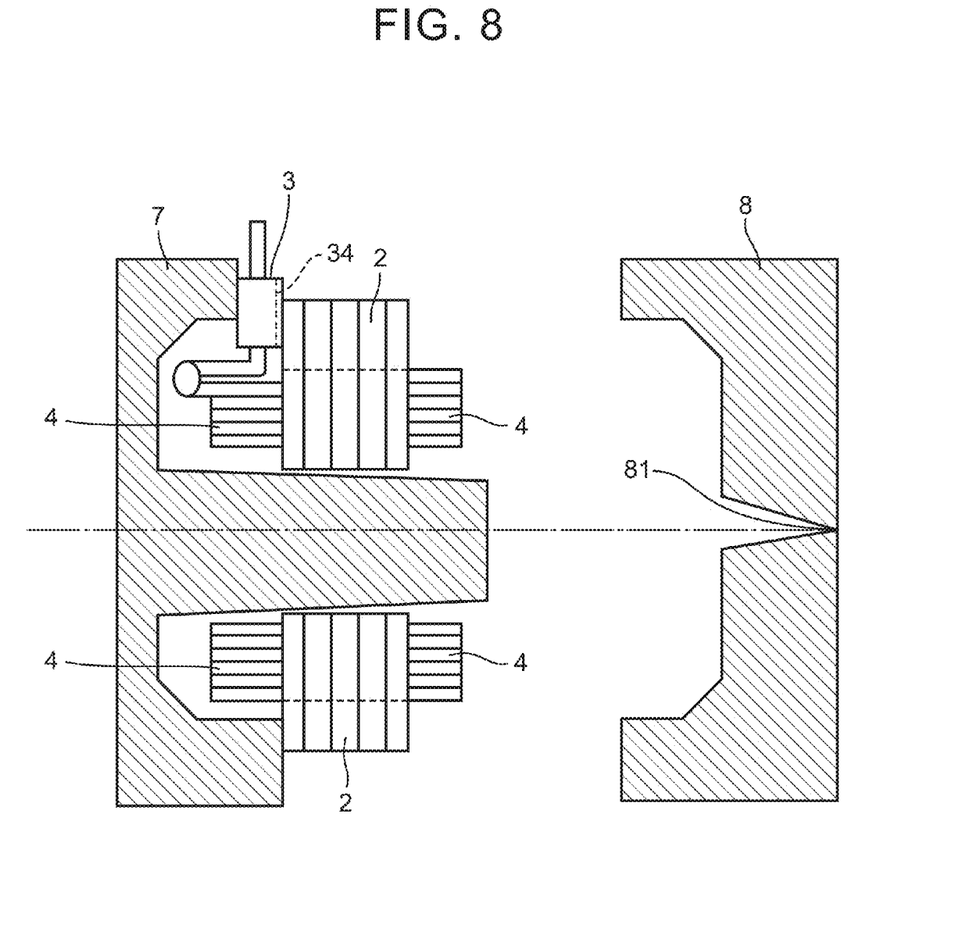
FIG. 8 is a schematic view of the manufacturing method according to the first embodiment.
Figure 9:
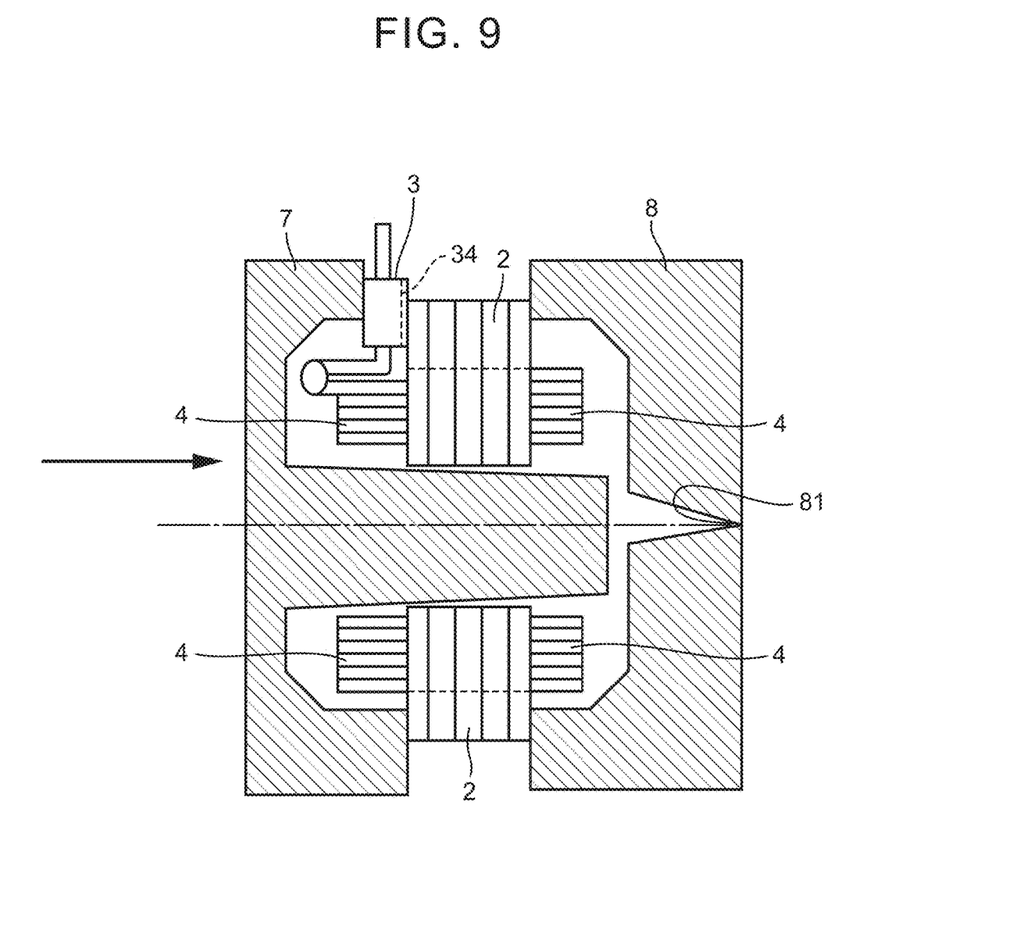
FIG. 9 is a schematic view of the manufacturing method according to the first embodiment.
Figure 10:
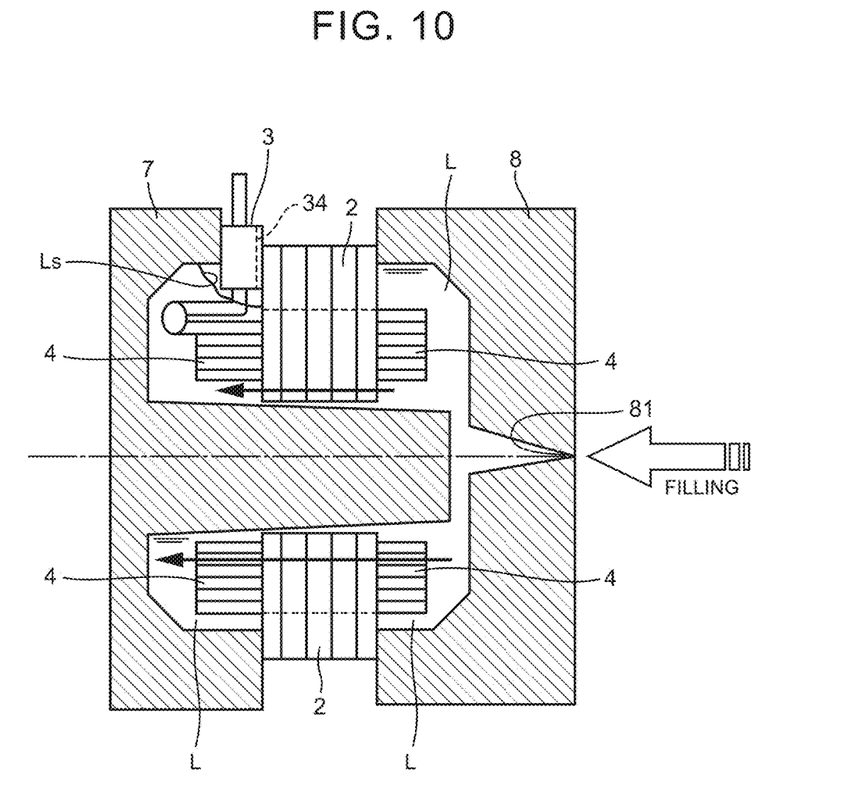
FIG. 10 is a schematic view of the manufacturing method according to the first embodiment.

Next, a manufacturing method according to the first embodiment will be described with reference to FIGS. 7 to 10. FIG. 7 shows a flow chart of the manufacturing method according to the first embodiment. FIGS. 8 to 10 are a schematic view of the manufacturing method according to the first embodiment.

As shown in FIG. 8, the terminal portion 3 and the core 2 wound around the coil 4 are arranged on a movable mold 7 (arrangement step S1). Here, the terminal portion 3 and at least a part of the core 2 are arranged such that they are positioned on a top portion of the movable mold 7. Here, the top portion of the movable mold 7 may be located at any position as long as it is higher than the center of the movable mold 7. It is more preferred, for example, to be at a position of the same height as the highest portion of a cavity in the movable mold 7. The top portion is a portion which is located higher than the center of the movable mold 7 with respect to the vertical direction. By providing the slit 34 on the core 2, a gap is formed between the core 2 and the terminal portion 3. The gap is wide enough so that gas can pass through the gap. In the meantime, the terminal portion 3 may be held on the top portion of the core 2 by bonding or engagement. The movable mold 7 and a fixed mold 8 are installed on an injection molding apparatus (not shown) and is supplied with a power necessary for, injection molding.

Subsequently, as shown in FIG. 9, by moving the movable mold 7 toward the fixed mold 8, the core 2 and the terminal portion 3 are sandwiched between the movable mold 7 and the fixed mold 8 (mold clamp step S2). The core 2 and the terminal portion 3 are sandwiched by the movable mold 7 and the fixed mold 8 with a predetermined surface pressure. Here, a space inside the mold is closed by the movable mold 7, the fixed mold 8, the core 2 and the terminal portion 3 and a cavity is formed. The gap between the slit 34 and the core 2 is maintained wide enough so that gas can pass through the gap.

Subsequently, as shown in FIG. 10, the cavity is filled with resin L from a gate 81 of the fixed mold 8 so that the resin L is solidified (filling step S3). Speaking in detail, the resin L flows to the fixed mold 8 side of the cavity, passes between the teeth 22 and the like and flows to the movable mold 7 side of the cavity. In this while, gas inside the cavity passes through the gap between the core 2 and the slit 34 and is discharged out of the cavity. The gap between the slit 34 and the core 2 in the terminal portion 3 functions as a gas discharging port. Subsequently, the cavity is filled with the resin L except the top portion of the fixed mold 8, including the terminal portion 3 and the core 2. Here, a surface Ls of the resin L reaches the vicinities of the terminal portion 3 and the core 2. The air remaining in the cavity passes through the gap between the slit 34 and the core 2 so that the air continues to be discharged out of the cavity. Although the resin L further flows into the gap between the slit 34 and the core 2, the resin L is solidified so as to stop the flow of the resin L. Here, because the slit 34 extends in a zigzag manner (see FIG. 6), the resin L is solidified in the slit 34 without passing through the slit 34 thereby stopping the flow of the resin. As a result, the resin L can be prevented from leaking from outside of the cavity. Further, even if resin having a low viscosity is used as the resin L, the resin L can be prevented from leaking from outside of the cavity.

Because air inside the cavity is discharged successively out of the cavity in the above-described process, the cavity is filled with the resin L without containing much air. As a result, generation of poor appearance such as air trap and a defect such as void can be suppressed. After that, the resin L is solidified so as to form the resin portion 1.

Finally, the movable mold 7 is moved in a direction of leaving the fixed mold 8 (mold opening step S4). The molded body 9 (see FIG. 1) is taken out of the fixed mold 8. As required, unnecessary portions such as burr and a runner may be trimmed from the molded body 9.

In the above-described manufacturing method of the first embodiment, a gas discharging port is provided on the top side of the mold which is filled with resin last and thereby gas can be discharged successively. Without using the vacuum apparatus, air inside the cavity can be discharged through the gap between the core and the terminal portion formed by provision of the slit, so that the molded body having few defects can be manufactured. Further, because the slit is provided between the terminal portion and the core which constitute the molded body, each time when molding is performed, gas inside the cavity can be discharged through a new slit. As a result, clogging of the slit due to repeated molding can be prevented and cleaning operation for the slit can be omitted, and generation of a defective product of the molded body due to the clogged slit can be prevented.

Further, according to the manufacturing method of the first embodiment, the stator provided with the molded body having few defects can be obtained. Further, a motor having this stator can be obtained.

Figure 11:
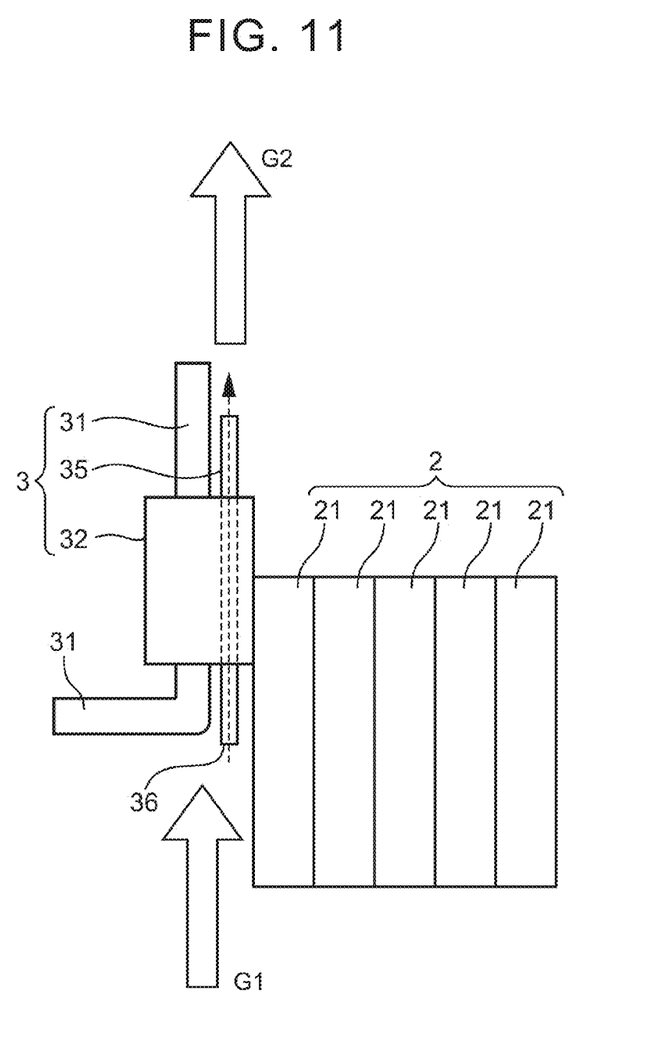
FIG. 11 is a side view of the major portion of a molded body according to a second embodiment.
Figure 12:
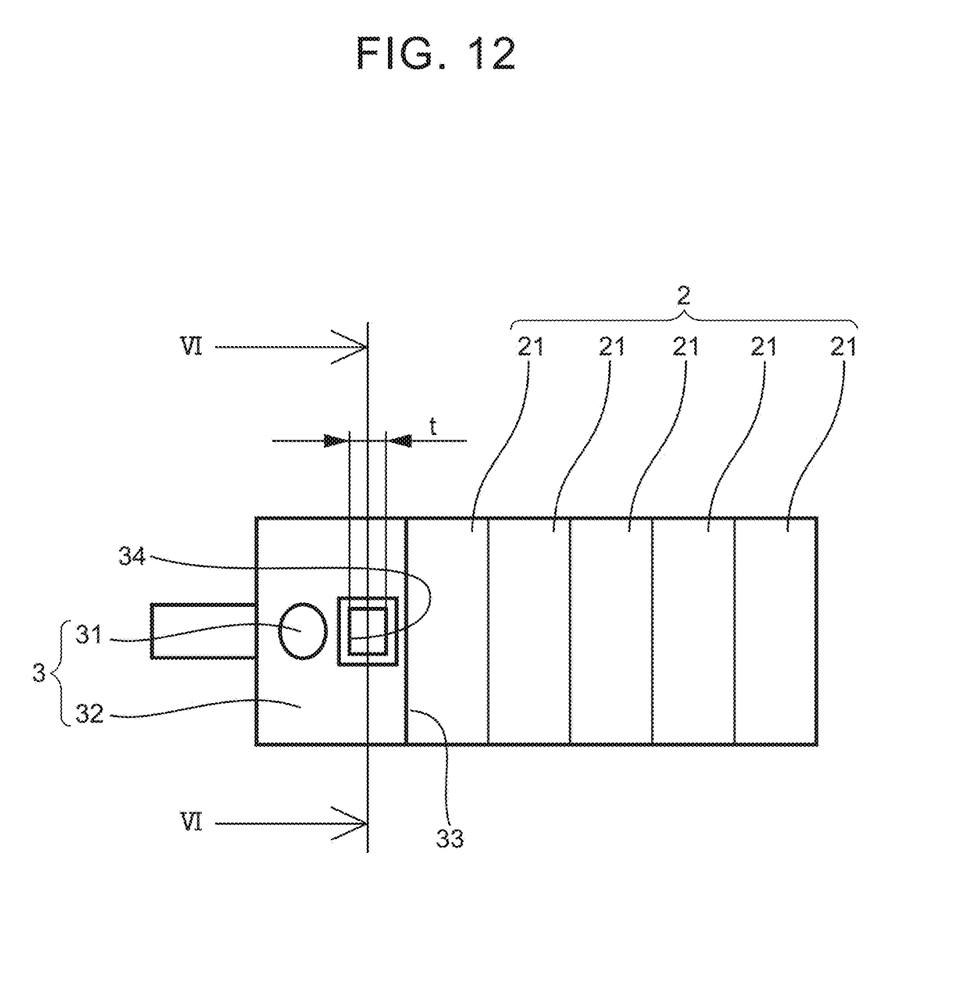
FIG. 12 is a top view of the major portion of the molded body according to the second embodiment.

Second embodiment Next, a molded body according to the second embodiment will be described with reference to FIGS. 11 and 12. FIGS. 10 and 11 are a schematic view of the major portion of the molded body according to the second embodiment. FIG. 12 is a schematic view of the major portion of the molded body according to the second embodiment. The manufacturing method of the second embodiment is different from the manufacturing method of the first embodiment in only the terminal portion. Description of other common structure is omitted.

As shown in FIGS. 11 and 12, the terminal portion 3 of the molded body holds a pipe 35 as well as the terminal 31. The pipe 35 is mounted such that its bottom end 36 projects into the cavity. The bottom end is a lower end portion in the vertical direction of the pipe 35. The length from the base portion 32 up to the bottom end 36 of the pipe 35 is adjusted appropriately. The pipe 35 is a pipe having a square section. In the meantime, the pipe 35 may be a pipe having a round section. The range of the length t of the gap of an opening of the pipe 35 is preferred to be 0.01 to 0.2 mm. Here, it is assumed that gas flows in a direction G1 from downward to upward of the pipe 35. Then, gas passes through the gap of the opening from the bottom end 36 of the pipe 35 and further flows in a direction G2 which goes upward from the top side of the terminal portion 3. Further, the resin portion 1 may invade into the gap of the opening of the pipe 35.

Figure 13:
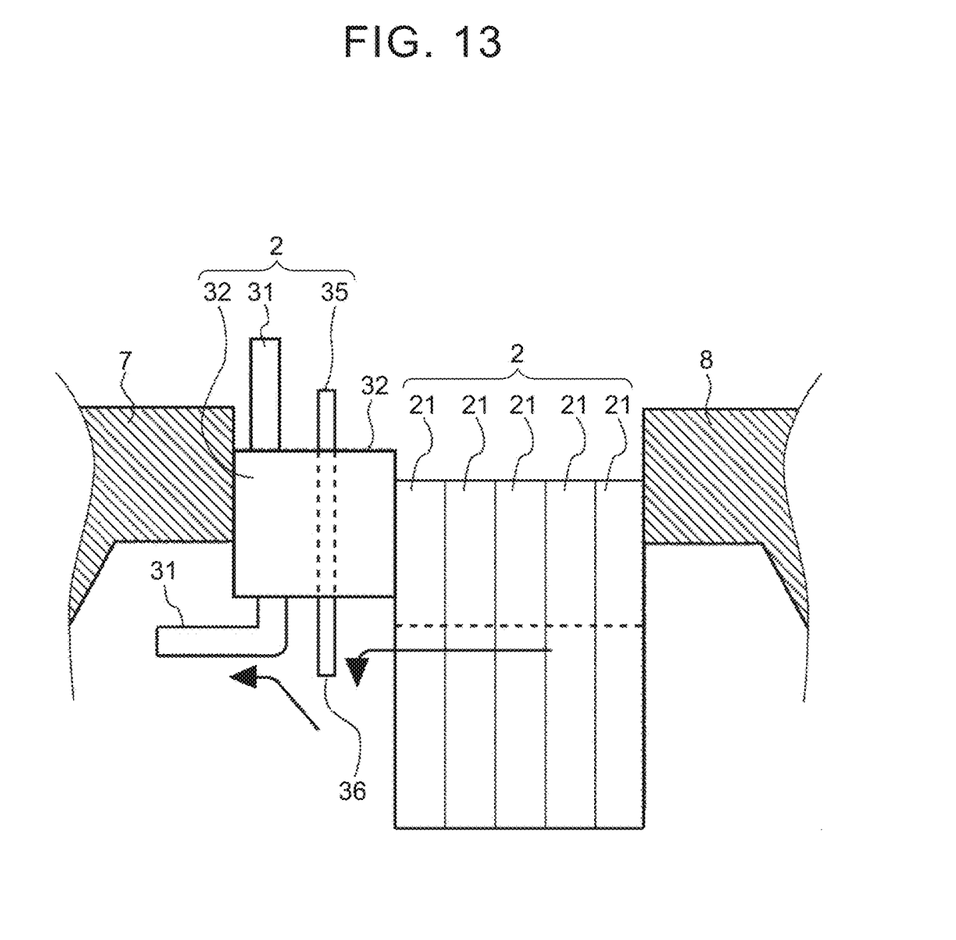
FIG. 13 is a schematic view of a manufacturing method according to the second embodiment.

Next, the manufacturing method of the second embodiment will be described with reference to FIG. 13. FIG. 13 is a schematic view of the manufacturing method according to the second embodiment.

First, a manufacturing process passes the arrangement step S1 and the mold clamp step S2 (see FIG. 7) like the manufacturing method according to the first embodiment.

Subsequently, resin is filled into the cavity from a gate 81 of the fixed mold 8 and solidified (filling step S23) (see FIG. 10). Like the filling step S3, the resin L flows into the cavity so that the cavity is filled with the resin L except the top side of the fixed mold 8, particularly the terminal portion 3 and the core 2. Here, a surface of the resin reaches the vicinities of the terminal portion 3 and the core 2. In this while, air remaining inside the cavity passes through the pipe 35 and continues to be discharged out of the cavity. The pipe 35 functions as a gas discharging port.

Although the resin attempts to further flow into the pipe 35, gas inside the cavity is discharged successively from the pipe 35. The reason is considered to be that resin cannot flow into the pipe 35 easily or pressure is not applied to the resin easily because, for example, the bottom end 36 of the pipe 35 projects out of the base portion 32 as shown in FIG. 13. Subsequently, the resin flows into the pipe 35 and is solidified inside the pipe 35 to stop the flow of the resin. That is, no resin leaks out of the cavity through the pipe 35. Because, as described above, air inside the cavity is discharged successively out of the cavity, the resin is filled in the cavity without swallowing air thereby preventing generation of poor appearance such as air trap and a defect such as void. After that, the resin is solidified so as to form the resin portion 1.

Finally, a molded body 209 is obtained via the mold opening step S4 like the manufacturing method according to the first embodiment.

According to the second embodiment, as described above, the gas discharging port is provided on the top side of the mold which is filled with resin at the end like the first embodiment. As a result, gas can be discharged successively. Without using the vacuum apparatus, air inside the cavity can be discharged so that a molded body having few defects can be manufactured. Further, because the pipe is provided on the terminal portion which constitutes the molded body as a gas discharging port, each time when molding is performed, gas inside the cavity can be discharged through a new pipe. As a result, clogging of the pipe due to repeated molding can be prevented and cleaning operation for the gas discharging port can be omitted, and generation of a defective product of the molded body due to the clogged gas discharging port can be prevented.

Further, according to the manufacturing method of the second embodiment, a stator provided with a molded body having few defects can be obtained like the manufacturing method of the first embodiment. Further, a motor having this stator can be obtained.

Figure 14:
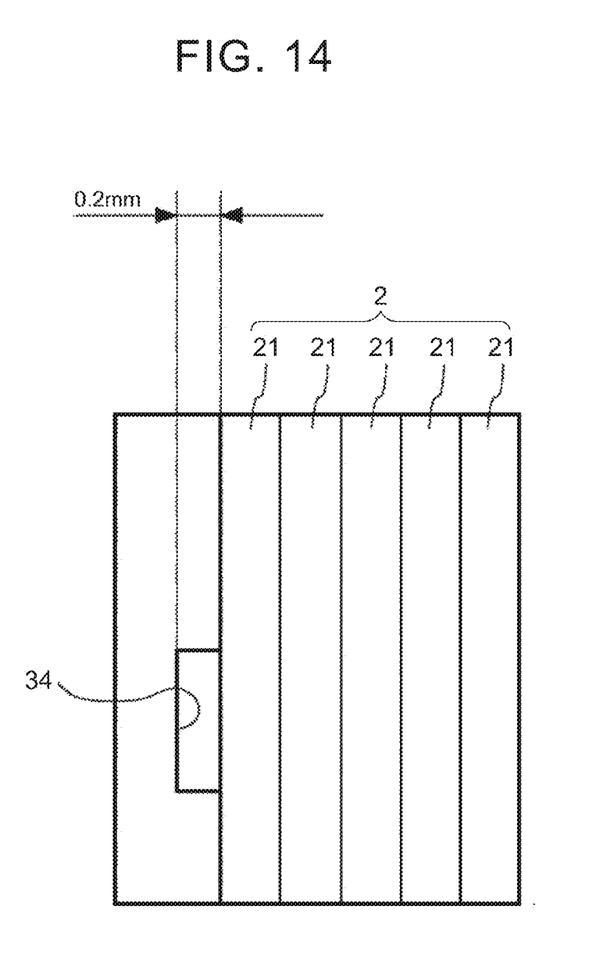
FIG. 14 is a schematic view of an example of a terminal portion and a core.
Figure 15:
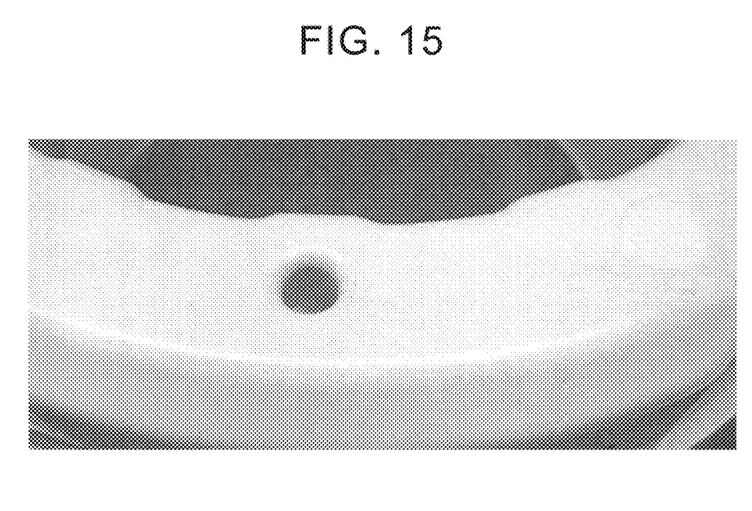
FIG. 15 is a photograph showing the appearance of a resin portion.
Figure 16:
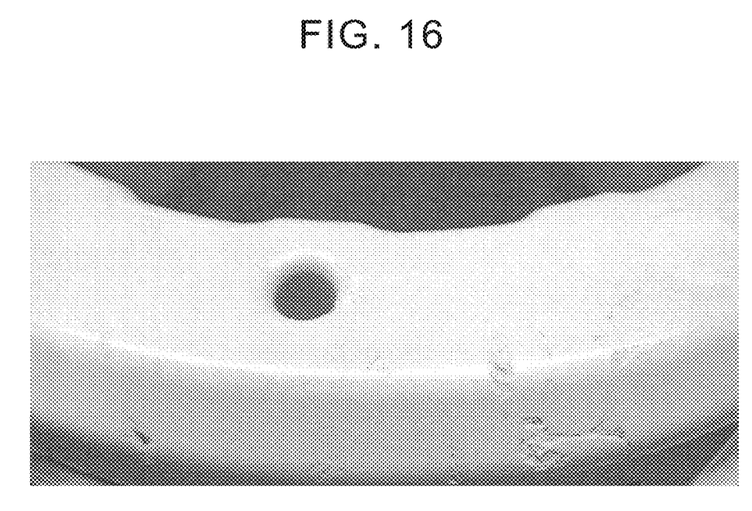
FIG. 16 is a photograph showing the appearance of the resin portion.

Prototype experiment. Next, a result of observation of the appearance of a prototype manufactured according to the manufacturing method of the first embodiment will be described with reference to FIGS. 14 to 16. A result of observation of the appearance of a comparative example manufactured according to the same manufacturing method as the manufacturing method of the first embodiment except using of a terminal portion having no slit also will be described for comparison. FIG. 14 is a schematic view of an example of the terminal portion and the core. FIGS. 15 and 16 are photographs showing the appearance of the resin portion.

An example was manufactured according to the manufacturing method of the first embodiment. In the example, the thickness t of a gap between the slit 34 and the core 2 is 0.2 mm as shown in FIG. 14.

As shown in FIG. 15, no defect such as air trap was recognized on the surface of the resin portion in the example, so that a mold shape was transferred accurately. The air trap mentioned here means a dent which is generated on the surface of the molded body because gas in the cavity cannot be discharged excellently. That is, in the example, the appearance of the resin portion was excellent and the resin portion had few defects.

On the other hand, as shown in FIG. 16, the air traps were recognized at a number of places of the surface of the resin portion of the comparative example. In the comparative example, the resin portion had poor appearance and defects were recognized.

In the meantime, the present invention is not restricted to the above-described embodiments but may be modified appropriately within a range not departing from the spirit of the invention.

What is claimed is:

1. A manufacturing method for manufacturing a stator using molds, the stator being constructed so that a stator main body, having a terminal portion and a magnetic steel sheet, and a resin molded portion are integrated, the stator main body including a terminal portion and a core, the manufacturing method comprising:

arranging the stator main body such that the terminal portion is located on a top portion of the molds; and filling a cavity of the molds with resin, wherein the terminal portion includes a gas discharging port that discharges gas out of the cavity from inside the molds, the gas discharging port is a recess portion extending in a zigzag manner that is formed on a part of a face of the terminal portion that contacts with the magnetic steel sheet.

2. A manufacturing method for manufacturing a stator using molds, the stator being constructed so that a stator main body, having a terminal portion and a magnetic steel sheet, and a resin molded portion are integrated, the manufacturing method comprising:

arranging the stator main body such that the terminal portion is located on a top portion of the molds; and filling a cavity of the molds with resin, wherein the terminal portion has a gas discharging port that discharges gas out of the cavity from inside the molds, and the gas discharging port is a pipe which passes through the terminal portion, wherein a bottom end of the pipe projects out of a base portion and the resin flows into and solidifies within the pipe.

* * * * *